Patented Nov. 23, 1926.

1,607,891

UNITED STATES PATENT OFFICE.

CLAY M. HUDSON, OF MANILA, PHILIPPINE ISLANDS.

COMPOSITE MOTOR FUEL.

No Drawing. Application filed June 2, 1922, Serial No. 565,483. Renewed June 22, 1926.

The invention relates to a fuel for internal combustion engines and has for its object to provide a novel composite fuel including alcohol and acetone, with preferably a small quantity of kerosene, and a suitable reagent, that will be effective in neutralizing the products resulting from the combustion of the fuel in the engine, said products including highly acid compounds resulting from the decomposition of the alcohol and acetone, and which attack the metallic elements of the engine, unless the acidity of the products is completely neutralized.

I have discovered that aniline, known to chemists as phenyl-amin, or amino-benzene, when admixed in suitable proportion with a composite fuel consisting of alcohol and acetone, and preferably a small portion of kerosene, will be absolutely effective in neutralizing any acid reaction of the fuel prior to ignition and in neutralizing the acid reaction of the products of combustion resulting from the explosion of the mixture in the engine, so that the engine parts will not be attacked by the products of combustion, as would be the case if a neutralizing reagent were not used.

The relative proportions of alcohol, acetone and aniline vary slightly according to conditions of climate and type of engine used. A typical admixture for tropical climates is ethyl alcohol 60%, acetone 37%, kerosene 2% and aniline 1%, all by volume. Generally a higher percentage of acetone may be used in colder climates, say up to 45%, with a corresponding reduction in alcohol. Slightly more acetone may be used in a high speed engine than a low speed engine.

What I claim is:

1. A motor fuel comprising an admixture of alcohol, acetone and substantially 1% of aniline.

2. A motor fuel comprising an admixture of alcohol, acetone, substantially 2% of kerosene and substantially 1% of aniline.

3. A motor fuel comprising an admixture of the following compounds in substantially the proportions, by volume, indicated; alcohol 60%, acetone 37%, kerosene 2% and aniline 1%.

In testimony whereof I hereto affix my signature in the city of Manila, Philippine Islands, this 30th day of March A. D. 1922.

CLAY M. HUDSON.